(12) United States Patent
Barbir (10) Patent No.: US 8,075,230 B2
(45) Date of Patent: Dec. 13, 2011

(54) PLANT AND STEM DESIGN AND METHOD OF MAKING

(75) Inventor: Wesley Val Barbir, Huntington Beach, CA (US)

(73) Assignee: The Enkeboll Co., Carson, CA (US)

( * ) Notice: Subject to any disclaimer, the term of this patent is extended or adjusted under 35 U.S.C. 154(b) by 0 days.

(21) Appl. No.: 12/716,213

(22) Filed: Mar. 2, 2010

(65) Prior Publication Data
US 2010/0159161 A1    Jun. 24, 2010

Related U.S. Application Data

(62) Division of application No. 11/397,402, filed on Apr. 4, 2006, now Pat. No. 7,744,317.

(51) Int. Cl.
*B23C 3/00* (2006.01)
*A41G 1/02* (2006.01)
*A41G 1/00* (2006.01)

(52) U.S. Cl. ........................ 409/132; 144/371
(58) Field of Classification Search .......... 409/131–132; 29/557–558; 144/371, 363, 359; 428/17, 428/21–23, 16, 153; D25/136, 145, 147, D25/149; D1/106, 115; D11/117, 157, 139
See application file for complete search history.

(56) References Cited

U.S. PATENT DOCUMENTS

| | | |
|---|---|---|
| 751,307 A | 2/1904 | Lake |
| 836,887 A | 11/1906 | Miller |
| 1,054,252 A | 2/1913 | Stranders |
| D52,746 S | 12/1918 | Holstein |
| 1,436,024 A | 11/1922 | Emery |
| 1,481,314 A | 1/1924 | De Felice |
| 2,896,352 A | 7/1959 | Strauss |
| 3,189,508 A | 6/1965 | Burnbaum |
| D351,569 S | 10/1994 | Chin-Sheng |
| 5,525,382 A | 6/1996 | White |
| 5,858,485 A | 1/1999 | Chou |
| 6,357,977 B1 | 3/2002 | Momochi et al. |
| 6,502,002 B2 | 12/2002 | Susnjara et al. |
| 6,555,188 B1 | 4/2003 | Chapman |
| D525,719 S | 7/2006 | Ellsley |
| D525,720 S | 7/2006 | Ellsley |
| D525,722 S | 7/2006 | Ellsley |
| D525,723 S | 7/2006 | Ellsley |

(Continued)

OTHER PUBLICATIONS

Printout from woodturns.com, dated by the Internet archive to be from Apr. 28, 2002, article entitled "Making Bananas", 3 pages.

(Continued)

*Primary Examiner* — Erica E Cadugan
(74) *Attorney, Agent, or Firm* — Stetina Brunda Garred & Brucker (57) ABSTRACT

A lifelike carving product and a method of producing the same is provided. The product may be utilized as an onlay or integral part of architectural elements to show designs of plant, fruit, and/or vegetable. The product includes at least one plant body, at least one stem, and a realistic fruit-stem/vegetable-stem interface. The plant body may include a flattened area, a stem receptacle whereat a plant end of the stem converges to the plant body, and an arcuate rim that at least partially surrounds the plant end in the stem receptacle. The realistic fruit-stem/vegetable-stem interface may be formed with the stem converging to the plant body perpendicularly with respect to a tangent line, or with a stem centerline of the stem aligning with a stem plane.

2 Claims, 4 Drawing Sheets

U.S. PATENT DOCUMENTS

| | | |
|---|---|---|
| D526,069 S | 8/2006 | Ellsley |
| D526,725 S | 8/2006 | Ellsley |
| D527,115 S | 8/2006 | Ellsley |
| D527,116 S | 8/2006 | Ellsley |
| D527,117 S | 8/2006 | Ellsley |
| D527,118 S | 8/2006 | Ellsley |
| D527,469 S | 8/2006 | Ellsley |
| 7,744,317 B2 * | 6/2010 | Barbir .................. 409/131 |
| 7,947,344 B2 * | 5/2011 | Miller .................. 428/21 |

OTHER PUBLICATIONS

Article titled Making Wooden Fruit, excerpted from 'Woodturning a Foundation Course' by Keith Rowley, copyright 1999.

Printout from www.exbali.com titled 'Export Bali', 2 pages, Dec. 6, 2004.

Printout from www.invitinghome.com showing grape motif wood carvings, 4 pages, Oct. 13, 2005.

Printout from www.mumis.com, titled "Murni's Online Shop", 10 pages, Jul. 29, 2004.

Printout from www.bellalunatoys.com showing wooden grapes, Oct. 2004.

Printout from www.belialuna.com showing a closeup picture of wooden grapes, Jun. 2003.

* cited by examiner

MULTI-AXIS
MACHINING CENTER

*Fig. 11*

PLANT AND STEM DESIGN AND METHOD OF MAKING

CROSS-REFERENCE TO RELATED APPLICATIONS

The present application is a divisional patent application of U.S. patent application Ser. No. 11/397,402 filed on Apr. 4, 2006, now U.S. Pat. No. 7,744,317, the entire contents of which are incorporated herein by reference.

STATEMENT RE: FEDERALLY SPONSORED RESEARCH/DEVELOPMENT

Not Applicable

BACKGROUND

The present invention generally relates to carvings, and more particularly to an intricately detailed carving product and process of making the same that incorporates various innovative and realistic aspects of plants, stems, and leaves, such as a fruit-stem/vegetable-stem interface, in order to create a highly lifelike carving.

In recent years, there has been an increasing demand for fine architectural elements, such as carvings and moldings, to accent the interior of homes, offices, and other buildings. Such architectural elements may be found in and include arches, keys, crowns, cabinet parts, capitals, columns, corbels, mantels, moldings, onlays, pulls, and various other panels and products. These architectural elements often incorporate elegant floral, grape, leaf, acanthus, cherubs, medallions, as well as other architectural designs and vast other artistic designs. The architectural elements may be made of various types of materials, such as woods including maple, red oak, cherry, white oak, mahogany, black walnut, and alder woods, to name a few. Other materials may include fiberboard, plastic, and composites, and are especially useful when the final product need not have a wood grain, such as if the product will be painted instead of being stained.

These architectural elements may be used on doors, cabinets, houses, and other structures as desired. They provide ornamental designs and decorative appearances, thus enhancing the aesthetic appeal of the area in which such ornamental architectural elements are found, be it a house, a kitchen, a bedroom, or other areas. Traditionally these architectural elements have been hand-carved using chisels, gouges, mallets, and the like. In recent years, however, techniques have been developed to automate the process, such as by utilizing computer numerical control (CNC) machinery with attendant operator-inputted programming to guide the same.

Figure 1:
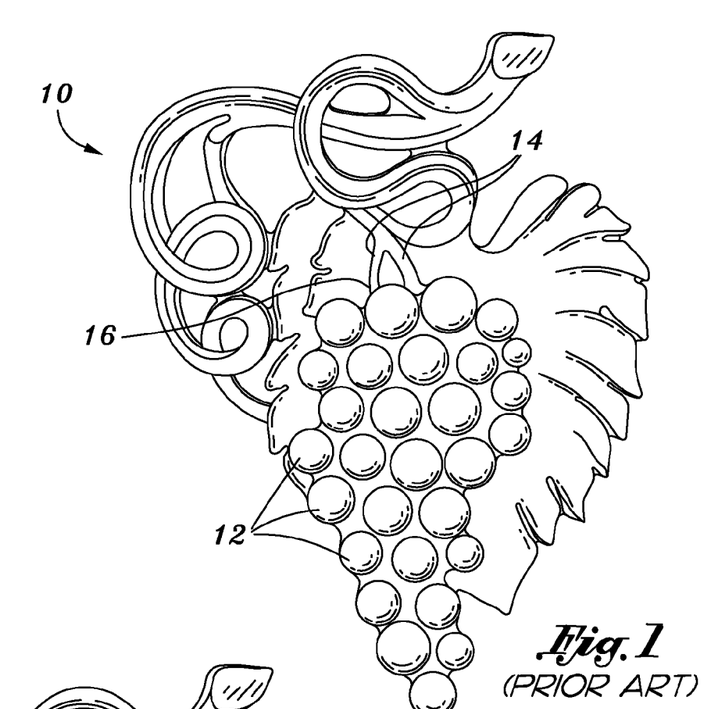
FIG. 1 is a top view of a prior art onlay carving illustrating grapes and stems.

One of the most popular decorative designs used in architectural elements is the use of vegetables or fruits, including grapes, berries, apples, oranges, etc., and vines and/or leaves to accompany the vegetables and/or fruits to create real-life settings. However, as illustrated in FIG. 1, a typical prior art grape and stem onlay carving product 10, which includes a bunch of individual fruits 12, such as grapes, tends to look more like a bunch of small golf balls than lifelike grapes. The prior art product of FIG. 1 includes two large stems 14 that intersect with a top end 16 of a plurality of the spherical fruits 12. These stems 14 appear discontinuous to the bunch of grapes, and do not appear to resemble lifelike stems. In addition, there are no other details in the prior art product that incorporate lifelike aspects of grapes. Further, there is apparently no current process or product that incorporates lifelike aspects of fruits, other than those mentioned above. Given these limitations, the products of the prior art appear only marginally realistic. The apparent failure to produce an extraordinarily lifelike fruit carving product may also cause would-be customers to defer to other types of decorative architectural elements.

Therefore, there is a need in the art for a product and method which can precisely simulate the lifelike aspects of fruits, vegetables, and other plants and objects. Further, there is a need in the art for a carving method that creates distinctly lifelike variations in fruit, vegetables, vines, stems, plants, and other realistic aspects of objects. In particular, there is a need in the art for a lifelike carving product and method that includes a realistic fruit-stem/vegetable-stem interface. Furthermore, there is a need in the art for a carving product and method that simulates the lifelike interrelationship of fruits/vegetables/objects, stems, and leaves.

BRIEF SUMMARY

In accordance with an embodiment of the present invention, a lifelike carving product and a method for producing the same are provided. The product is an architectural element that may be used as an onlay for decorative purposes and be incorporated into various applications such as corbels, molding, legs, and numerous other architectural elements. It may incorporate various types of plant shapes, such as fruit or vegetable shapes, and advantageously incorporate innovative design aspects of plants, such as a realistic fruit-stem/vegetable-stem interface. The product, as described below, may also incorporate several other lifelike features that produce a more realistic and aesthetically pleasing depiction. In this regard, the product may use vegetable or fruit designs, including grapes, bananas, pears, berries, apples, oranges, etc., as well as vines, leaves, and tree features that typically accompany such fruits and vegetables in real-life settings. Indeed, as used herein, "plant body" shall refer to the body of any type of plant, fruit, vegetable, flower, or other object as may be designed and utilized in the product according to the teachings herein.

As will be explained in further detail below, the method is preferably performed on a machining center, such as a multi-axis (preferably a five-axis) CNC mill. However, the method may be performed using a variety of tools, machines or otherwise, and the product may be crafted by hand or mechanically. The carving product may be formed from a blank. The blank may be fabricated from variety of materials such as woods, plastics, metals, composites, and other materials. In particular, such materials are preferably easily machinable and lightweight. Further, such materials are should be able to take paint or other coatings, for example, for aesthetic purposes. In addition, a negative form of the product may be created and other materials, such as resins, foams, liquids, and other suitable materials, which may be used to create the product using the negative form. The creation of the negative form may be performed using principles known in the art. The negative form should preferably provide a substantially equally-detailed and precise product as formed using the method described herein in order to ensure the lifelike nature of the product. The negative form may be used to create a solid foam product or may be used in conjunction with other manufacturing processes such as thermoforming or stamping to produce a hollow product.

The method includes the steps of fastening the blank to the machining center for processing. The blank defines an upper portion. Next, the blank is machined to form at least one elongate stem and at least one plant body into the upper portion of the blank. The stem defines a plant end. The plant body defines a top surface, and the plant body includes a stem receptacle whereto the plant end of the stem converges. The stem receptacle is at least partially disposed on the top surface of the plant body.

Additionally, the method also includes the step of machining an arcuate rim into the stem receptacle. The arcuate rim substantially encircles at least a portion of the plant end of the stem disposed within the stem receptacle.

According to an embodiment of the present method, the plant body defines a body centerpoint, the stem receptacle defines a receptacle centerpoint, and the blank defines a back plane. The plant body further defines a stem plane passing through the body centerpoint and the receptacle centerpoint. The stem defines a stem centerline. The stem plane is oriented substantially orthogonal to the back plane. In this regard, the method may further include the step of orienting the stem with the stem centerline at the plant end thereof being aligned with the stem plane upon converging to the stem receptacle. The stem may be curved with only the plant end thereof being disposed in the stem plane. This aspect of the present method may tend to provide a lifelike orientation of the stem with respect to the plant body.

In another embodiment of the present method, the plant body defines a generally circular perimeter and a tangent line intersecting the perimeter at an intersection point. In this regard, the stem receptacle may be disposed adjacent the intersection point with the stem centerline at the plant end of the stem converging to the stem receptacle at an at least 70 degree angle relative to the tangent line. Although the stem centerline at the plant end of the stem may converge to the stem receptacle at a variety of angles relative to the tangent line, it is preferable that the stem centerline at the plant end of the stem converges to the stem receptacle at an angle approximating or equal to perpendicular to the tangent line.

A further aspect of the present method includes the step of machining a flattened area into the top surface of the plant body adjacent the stem receptacle. The flattened area preferably extends outwardly from the stem receptacle and extends over approximately one-fourth of the top surface of the plant body.

According to yet another embodiment of the present method, a plurality of plant bodies may be disposed adjacent to each other to define a cluster of plant bodies. The cluster may be arranged to define an interstice intermediate the plant bodies of the cluster. The interstice may be variously sized, and is preferably at least as large as an individual stem. The method may thus further include the step of machining at least one stem within the interstice of the cluster. As taught above, the plant end thereof may converge to a given stem receptacle of a given plant body in the cluster. Furthermore, the stem may further define a vine end, and the method may also include the step of machining a plurality of stems within the interstice. Each of the plant ends of the plurality of stem may converge to a plurality of respective plant bodies of the cluster. However, the vine ends of each of the plurality of stems may converge to form a vine.

Additional aspects of the present method may also include machining the stem with the stem further defining a stem depth. The stem depth provides another aspect of lifelike realism for the carving product. In most embodiments, the stem depth is preferably at least 1/16 inch. The stem depth may be determined in response to the general configuration and arrangement of the stems and the plant bodies.

Furthermore, the method may also include producing a lifelike architectural product by: forming at least one elongate stem and a plurality of plant bodies into an upper portion of the product, the stem defining a plant end and a vine end, each plant body defining a top surface, given ones of the plant bodies including a stem receptacle whereto the plant end of the stem converges, the stem receptacle being at least partially disposed on the top surface of the given ones plant bodies, additional given ones of the plant bodies being disposed adjacent to each other to define a cluster of plant bodies and an interstice disposed within the cluster; forming at least one stem within the interstice of the cluster, the plant end thereof converging to a given stem receptacle of a given plant body in the cluster; forming at least one vine, the vine ends of a given plurality of stems converging to form the vine; forming an arcuate rim into the stem receptacle of the given ones of the plant bodies, the arcuate rim substantially encircling at least a portion of the plant end of the stem disposed within the stem receptacle; and forming a flattened area into the top surface of the given ones of the plant bodies, the flattened area being formed adjacent the stem receptacle; wherein the given ones of the plant bodies define a generally circular perimeter and a tangent line intersecting the perimeter at an intersection point, each respective stem defining a stem centerline; and wherein the stem receptacle of each given one of the plant bodies is disposed adjacent the intersection point with the stem centerline at the plant end of the stem converging to the stem receptacle at an at least 70 degree angle relative to the tangent line.

According to yet another aspect of the present method, the method may include the step of changing tools of the machining center. In this regard, it is preferable to begin the machining of the blank with roughing passes to remove as much material as possible while preserving the shape and design of the carving product. The method is preferably performed using five tools to form the carving product, although the method may easily be modified to use fewer or more tools. Thus, a first tool may be used to create a rough cut into the carving product. The first tool may be a ½ inch diameter drill bit. The method steps may be performed, and as the detail required by the tooling increases, the tools should decrease in diameter. Thus, a fifth tool may be used to create a finished cut into the carving product. In some cases, the fifth tool is a 1/16 inch diameter drill bit.

In another aspect of the present invention, a computer data signal is also provided that is embodied in a computer readable media for producing the lifelike carving product. The computer data signal comprises code configured to cause a processor to implement various embodiments, aspects, and implementations of the method disclosed herein.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, top and bottom, and the like are used solely to distinguish one from another entity without necessarily requiring or implying any actual such relationship or order between such entities.

Figure 2:
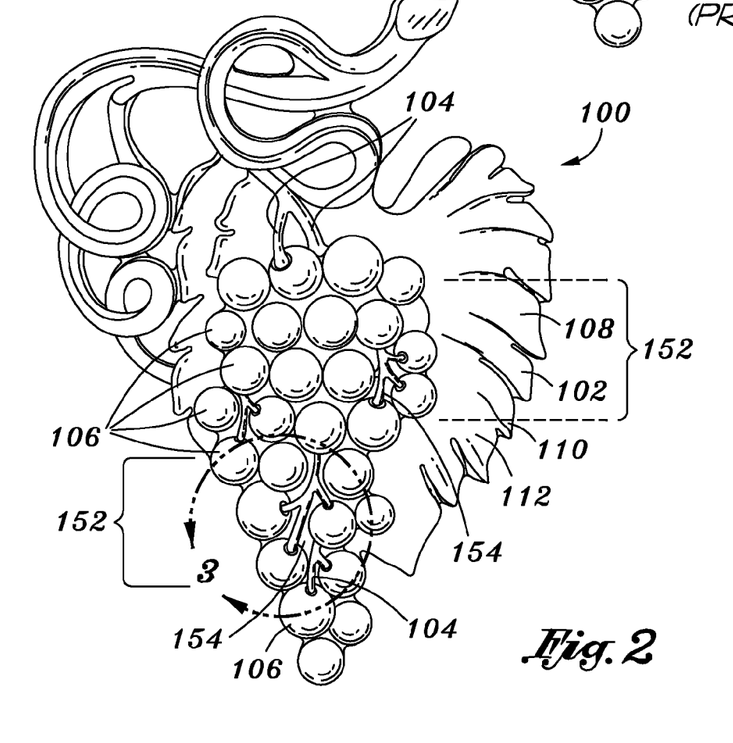
FIG. 2 is a top view of a lifelike carving product including a plurality of plant bodies and stems in lifelike interrelationship.

Referring now to the drawings wherein the showings are for purposes of illustrating preferred embodiments of the present invention and not for purposes of limiting the same, FIG. 2 is a top view of a lifelike carving product 100. The product 100 may incorporate various types of plant shapes, such as fruit, vegetable, or flower shapes, and advantageously incorporate innovative design aspects of plants, such as a realistic fruit-stem/vegetable-stem interface. The "fruit-stem/vegetable-stem interface" may be defined as including interfaces between a given stem of a given plant with another part of the given plant, such as a stem of a flower plant with a flower disposed on the stem thereof. Thus, the "fruit-stem/vegetable-stem interface" may be understood to refer to the area at which a given stem converges to another aspect of a given plant. As illustratively shown in FIG. 2, the product 100 may be configured to include a grape, stem, and leaf design. Further, the product 100 may be used as an onlay, for example, and decoratively placed in homes, offices, and other areas. Furthermore, the product 100 may be integrally formed into a façade of other architectural elements, such as corbels, moldings, legs, staircases, etc. Indeed, the teachings herein may be utilized to form architectural designs on any portion of a physically small or large architectural element—be it a very minor portion of large column or a majority of the visual surface of a corbel or onlay. Additionally, it is contemplated that the product 100 may also incorporate functional aspects depending on its use. For example, if used in a kitchen, the product 100 may include features such as hanging fixtures for towels, hot pads, and cooking utensils.

Additionally, although the product 100 is illustrated as incorporating a grape, stem, and leaf design, the product 100 may also a design of other types of plants, such as vegetables and fruits, such as oranges, cherries, and apples, just to name a few. The product 100 may incorporate various types of plant shapes, such as the realistic fruit-stem/vegetable-stem interface. The product, as described below, may also incorporate several other lifelike features that produce a more realistic and aesthetically pleasing depiction. In this regard, the product may use vegetable or fruit designs, including grapes, bananas, pears, berries, apples, oranges, etc., as well as vines, leaves, and tree features that typically accompany such fruits and vegetables in real-life settings.

Although embodiments of the present invention may be referred to as a "woodcarving," the product 100 and the methods of making the same can be performed not only with wood, but with various other materials as well, such as woods, plastics, metals, composites, and other materials, to name a few. Additionally, resins, foams, and other liquid materials may be used for negative forms, as described below. Indeed, the choice of a material that exhibits advantageous properties may be considered to be within the purview of one skilled in the art. Such properties may include being easily machinable, lightweight, and the ability to take paint or other coatings, for example, for aesthetic purposes. Furthermore, the following teachings may be modified in numerous ways and may result in products that exhibit various configurations, appearances, and textures; these alterations may likewise be performed by one of skill in the art. Finally, although the method is preferably taught as being performed on a machining center, such as a CNC mill, the method may be performed using a variety of tools, machines or otherwise, and the product may be crafted by hand or mechanically. For example, as discussed further below, the product 100 may also be formed using a negative form, which may facilitate the fabrication of the product 100 using operations such as molding, thermoforming, stamping, etc. Therefore, the teachings herein may be beneficially applied and used to form the product 100 by machine or by hand.

According to an implementation of the present invention, the product 100 may be formed from a blank 102, which may be fabricated of one or more of the aforementioned materials. Once the blank 102 is selected, the blank 102 may then be processed through several forming operations, and the product 100 is formed thereby. As will be explained in further detail below, although the blank may be processed using hand tools or power tools and the like, the method is preferably performed on a machining center, such as a multi-axis (preferably a five-axis) CNC mill. The CNC mill provides an efficient means for machining, i.e. carving, the product 100.

Figure 3:
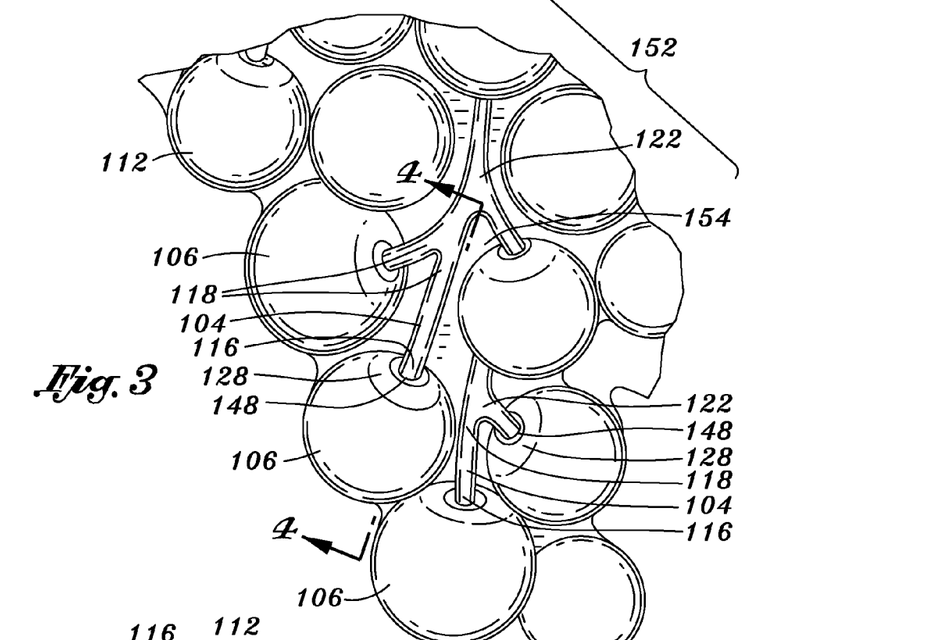
FIG. 3 is a detailed partial top view of the carving product of FIG. 2 illustrating the lifelike interrelationship of the plant bodies and the stems, particularly illustrating stem receptacles disposed on the plant body whereat the stems converge to the respective plant bodies.

One of the innovative and novel aspects of embodiments of the present invention, as shown in FIG. 3, is the fruit-stem/vegetable-stem interface wherein the design of the product 100 includes an elongate stem 104 that converges to a plant body 106 in a realistic or lifelike manner. The stem 104 and the plant body 106 are preferably disposed against a background 108, such as a leaf 110, shown in FIG. 2. The term "plant body" shall be understood to refer equally to both fruits and/or vegetables, as well as other objects as may be designed by one of skill in the art. Indeed, as used herein, "plant body" shall refer to the body of any type of plant or other object as may be designed and utilized in the product according to the teachings herein.

The limitations of the prior art included the failure to represent a realistic fruit-stem/vegetable-stem interface, in other words, the connection between a plant, such as a fruit or vegetable, and a stem. FIG. 1 shows the prior art carving product 10 which includes at least one large stem 14 that intersects with a top end 16 of a plurality of spherical fruits 12, which are represented as being grapes. As mentioned above, this representation does not produce a realistic fruit-stem/vegetable-stem interface. Therefore, one of the primary advantages that embodiments of the present invention have over such prior art products is the lifelike representation of the fruit-stem/vegetable-stem interface.

In order to achieve this lifelike fruit-stem/vegetable-stem interface, as shown in FIG. 3, the design of the stem 104 and the plant body 106 may be modified as taught herein. The blank 102 from which the design is machined, defines an upper portion 112 and a back plane 114. The stem 104 defines a plant end 116, a vine end 118, and a stem depth 120. The vine ends 118 of the stems 104 may also converge to form a vine 122. The plant body 106 may define a top surface 124, a plant perimeter 126, and includes a stem receptacle 128. The plant end 116 of the stem 104 may be defined as the distal portion of the stem 104 as it converges to the plant body 106. The plant end 116 is preferably less that one-half inch of an overall length of the stem 104. The top surface 124 of the plant body 106 may be defined as the three-dimensional surface portion of the plant body 106 visible in a two-dimensional top view of the product 100, as shown in FIGS. 2-3. As such, the top surface 124 is also shown as the upper rounded portion of the plant body 106 illustrated in FIGS. 4-5. Similar to the top surface 124, the plant perimeter 126 is also the general outline of the plant body 106 visible in a two dimensional view, as shown in FIGS. 2-3, and represents the outermost outline of the plant body 106. In this regard, the top surface 124 may be bounded by the plant perimeter 126, or in other words, the top surface 124 may terminate upon reaching the plant perimeter 126. Further, the plant body 106 may be variously shaped with the plant perimeter 126 defining the shape thereof, be it in the general shape of any plant, vegetable, object, or fruit, such as a apple, banana, grape, pear, etc.

Figure 4:
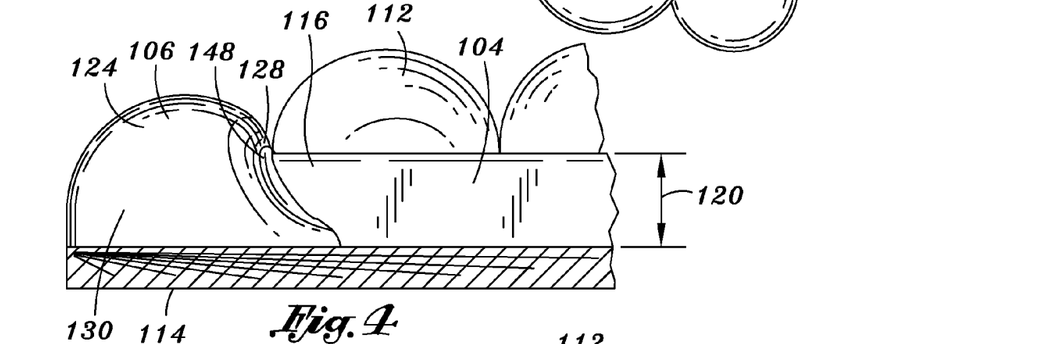
FIG. 4 is a cross sectional side view of the carving product of FIG. 3 showing the stem receptacle and an arcuate undercut for enhancing the lifelike appearance of the product.

Additionally, in some embodiments, the plant body 106 may define a side surface 130, which may be substantially orthogonal relative to the back plane 114 of the blank 102. This type of configuration may be easier to machine; however, other configurations are possible which include having the top surface 124 of the plant body 106, as shown in FIG. 4, and a lower surface of the plant body 106 which, instead of being orthogonal relative to the back plane 114 of the blank 102, slopes inwardly and tends to make the plant body 106 more quasi-spherical in shape. Thus, while more difficult to process, the undercutting of the lower surface of the plant body 106 may further enhance the lifelike and realistic appearance of the fruit-stem/vegetable-stem interface of the product 100.

Figure 6:
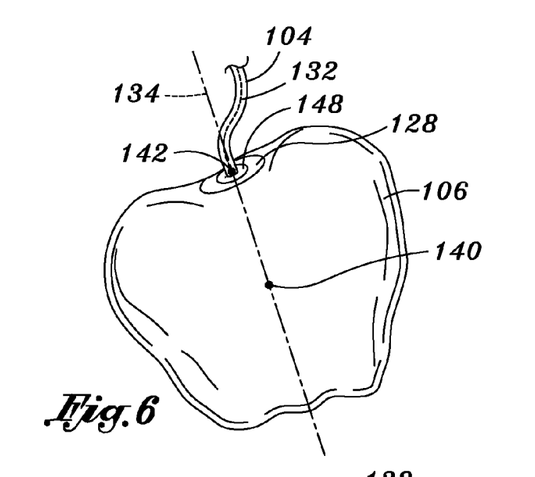
FIG. 6 is a top view of an embodiment of a plant body being shaped as an apple and illustrating the alignment of a plant end of the stem with the stem receptacle utilizing a body centerpoint and a receptacle centerpoint and a stem plane interposed therebetween with a stem centerline being aligned with the stem plane.
Figure 7:
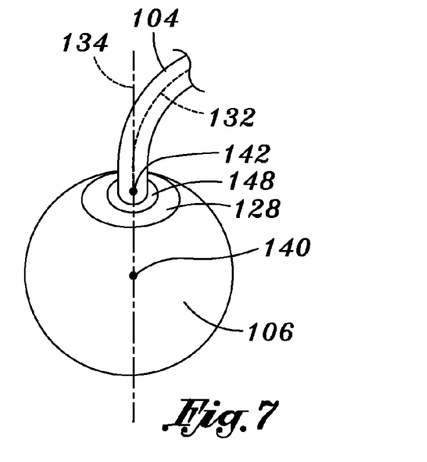
FIG. 7 is a top view of another embodiment of a plant body being shaped as a cherry and illustrating aspects as similarly shown in FIG. 6.
Figure 8:
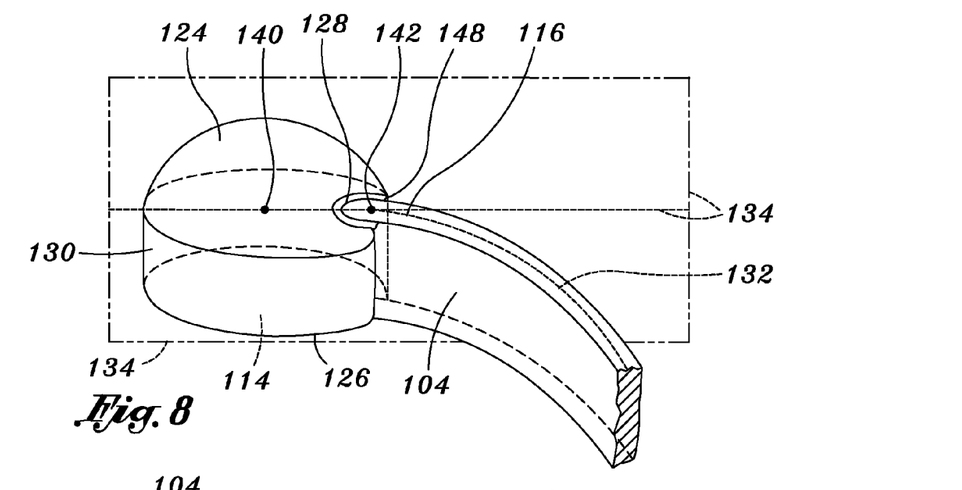
FIG. 8 is a side perspective view the embodiment of FIG. 7 wherein the stem plane and the stem centerline align at the plant end of the stem to enhance the lifelike appearance of the product, and wherein the stem plane is oriented substantially orthogonal with respect to a back plane of the product.

With further regard to the novel fruit-stem/vegetable-stem interface between the stem 104 and the plant body 106, the stem receptacle 128 of the plant body 106 is at least partially disposed on the top surface 124 of the plant body 106. The design of the plant end 116 of the stem 104 approaching the stem expression, as shown in FIGS. 6-8, the stem 104 approaches the plant body 106 with a stem centerline 132 at the plant end 116 of the stem 104 becoming aligned with a stem plane 134. In a second expression, shown in FIGS. 9-10, the stem centerline 132 at the plant end 116 of the stem 104 may be oriented at a convergence angle 136, between 70-90 degrees, with respect to a tangent line 138. Both expressions will now be described below.

According to the first expression, illustrated in FIGS. 6-8, the plant body 106 defines a body centerpoint 140, and the stem receptacle 128 defines a receptacle centerpoint 142. As mentioned previously, the blank 102 defines the back plane 114. Further, as illustrated in FIGS. 6-10, the stem 104 also defines the stem centerline 132. Additionally, as shown in FIG. 8, the stem plane 134 passes through the body centerpoint 140 and the receptacle centerpoint 142. The stem plane 134 is preferably oriented substantially orthogonal to the back plane 114. Thus, according to the first expression, the stem centerline 132 at the plant end 116 of the stem 104 becomes aligned with the stem plane 134 upon the plant end 116 converging to the stem receptacle 128. There is no minimum distance over which the stem centerline 132 must be aligned with the stem plane 134; instead, the design may be variously configured and the scale of the stem 104 to the plant body 106 may also vary. Nevertheless, the stem centerline 132 should preferably approach the stem plane 134 at a decreasing rate and eventually become aligned with the stem plane 134, which is shown in FIGS. 6-8.

As illustrated in FIG. 6, the plant body 106 may be shaped as an apple, cherry, banana, pear, or other fruit, vegetable, or object wherein the plant perimeter 126 of the plant body 106 is not substantially a circle. The first expression is therefore an advantageous method of designing the interface of the stem 104 and plant body 106 in such cases.

FIGS. 6 and 7 also illustrate that the stem 104 may also be curved with only the plant end 116 thereof being disposed in the stem plane 134. This aspect of the present method may tend to provide a lifelike orientation of the stem 104 with respect to the plant body 106. The stem 104 may therefore be designed in numberless configurations that may mimic real-life plants, fruits, vegetables, and/or other objects.

It is also contemplated that the stem 104 defines a pair of opposing stem sidewalls 144 that are disposed orthogonally with respect to the back plane 114 of the blank 102. The stem sidewalls 144 may also be utilized to define the stem depth 120. Referring again to the first expression of the interface of the stem 104 and the plant body 106, as the stem centerline 132 in the plant end 116 of the stem 104 approaches the stem plane 134, the stem sidewalls 144 may also become aligned parallel to the stem plane 134, as shown in FIG. 8. In this regard, the first expression may contemplate the three-dimensional nature of the interface of the stem 104 and the plant body 106 of the product 100.

Figure 9:
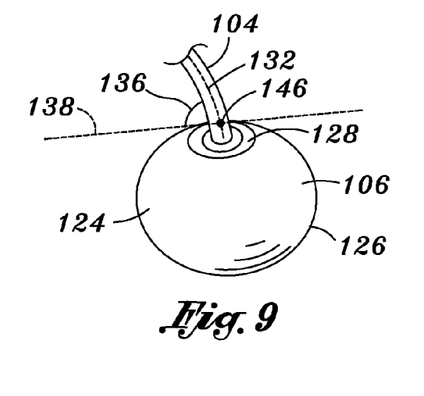
FIG. 9 is a top view of another embodiment of a plant body illustrating a tangent line being tangent to the plant body at an intersection point and further illustrating the stem centerline crossing the tangent line at a convergence angle for enhancing the lifelike appearance of an interface of the stem and the plant body.
Figure 10:
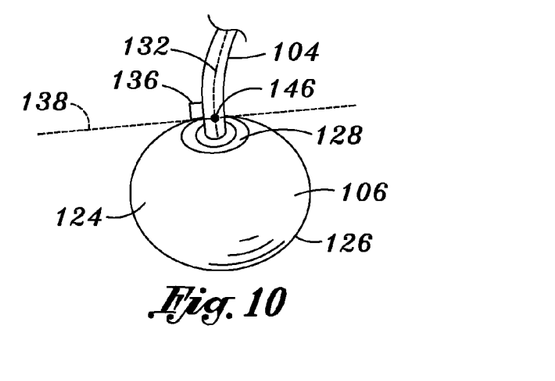
FIG. 10 is another top view of yet another embodiment of a plant body as similarly shown in FIG. 9 wherein the stem centerline is oriented substantially perpendicular to the tangent line at the intersection point for enhancing the lifelike appearance of the interface of the stem and the plant body.
Figure 11:
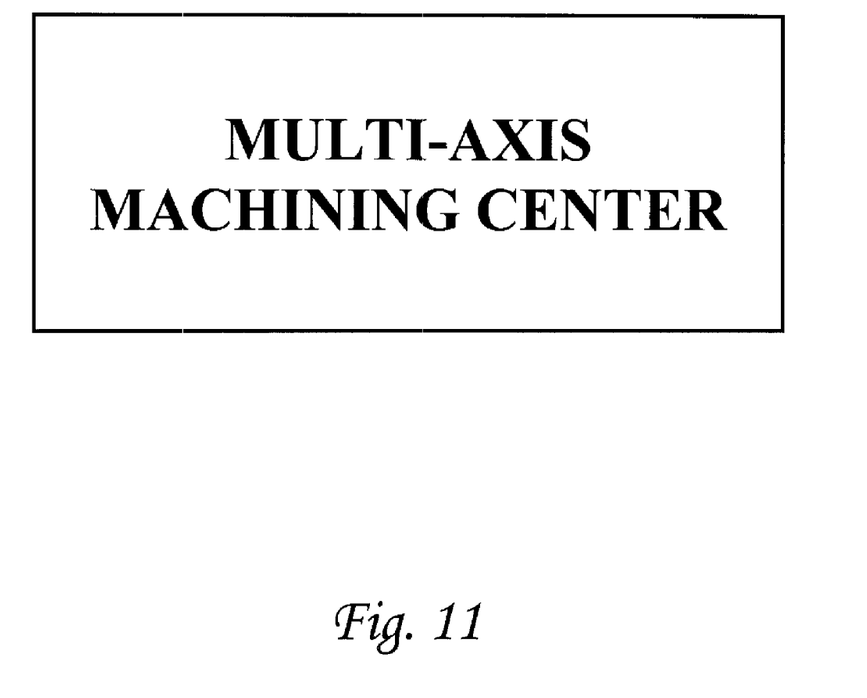
FIG. 11 is a schematic representation of a multi-axis machining center.

In the second expression of the plant end 116 of the stem 104 approaching the stem receptacle 128, as shown in FIG. 9-10, the plant perimeter 126 of the plant body 106 is generally circular and the tangent line 138 intersects the perimeter 126 at an intersection point 146. In this regard, the stem receptacle 128 is preferably disposed adjacent the intersection point 146 with the plant end 116 of the stem 104 converging to the stem receptacle 128 at the convergence angle 136, which is preferably at least 80 degrees, relative to the tangent line 138. Although the convergence angle 136 may be between 70-90 degrees and still maintain a lifelike interface appearance, the convergence angle 136 should preferably be approximately equal to 90 degrees (or perpendicular) relative to the tangent line 138, as shown in FIG. 10.

According to another innovative aspect of the present invention, the stem receptacle 128 may also include an arcuate rim 148 formed thereabout. The arcuate rim 148 of embodiments of the present invention provides distinct advantages over the prior art product shown in FIG. 1. The arcuate rim 148 was not utilized in such prior art products. Inclusion of the arcuate rim 148 within the stem receptacle 128 tends to increase the lifelike appearance of the product by simulating an actual junction between the plant end 116 of the stem 104 and the plant body 106. The simulated effect produced by the arcuate rim 148 provides a distinctive and novel feature that may be implemented in various embodiments of the present invention.

Figure 5:
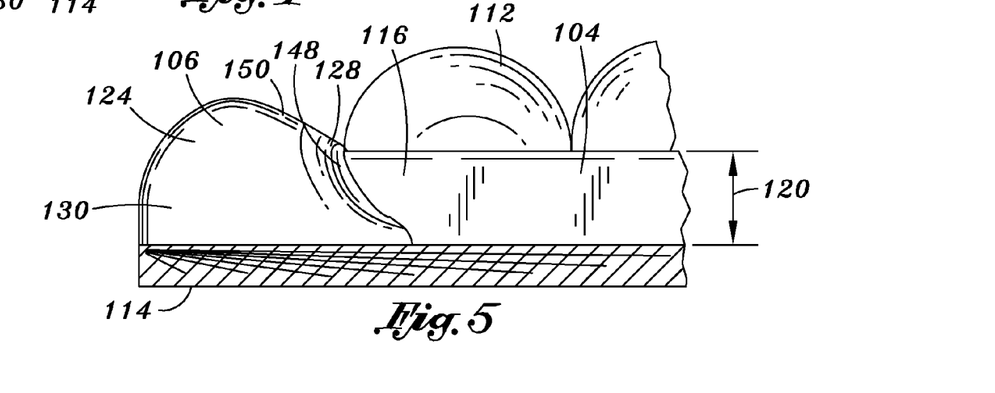
FIG. 5 is a cross sectional side view of an alternative embodiment of the carving product illustrated in FIG. 4 wherein the plant body further includes a flattened area for enhancing the lifelike appearance of the product.

The arcuate rim 148 may be formed as an indention that undercuts a portion of the plant end 116 of the stem 104 within the stem receptacle 128. In this regard, as shown in FIGS. 3-5, the arcuate rim 148 may substantially encircle at least a portion of the plant end 116 of the stem 104 disposed within the stem receptacle 128. The arcuate rim 148 is therefore preferably lower than the surrounding top surface 124 of the plant body 106 relative to the back plane 114 of the blank 102.

Referring now to FIGS. 3 and 5, a further aspect of embodiments of the present invention is that the plant body 106 may include a flattened area 150 in the top surface 124 thereof adjacent the stem receptacle 128. The flattened area 150 preferably extends outwardly from the stem receptacle 128 and extends over approximately one-fourth of the top surface 124 of the plant body 106. A comparison between FIGS. 4 and 5 illustrates a given plant body 106 not including a flattened area 150, shown in FIG. 4, and another given plant body 106 that does include the flattened area 150, shown in FIG. 5. The flattened area 150 preferably slopes downwardly toward the stem receptacle 128 relative to the back plane 114, as shown in FIG. 5, but may also be substantially parallel to the back plane 114.

In accordance with yet another innovative aspect of embodiments of the present invention, the product 100 may be formed to include a plurality of plant bodies 106 disposed adjacent to each other to define a cluster 152 of plant bodies, as shown in FIGS. 2 and 3. Such cluster 152, as indicated above, may be a grouping of plants, fruits, vegetables, and/or other objects that may be designed as the plant body 106. The cluster 152 may be arranged with variously sized and shaped plant bodies 106. As shown in FIGS. 2 and 3, the cluster 152 may also be arranged to define an interstice 154 intermediate the plant bodies 106 of the cluster 152. The interstice 154 may be variously sized, and is preferably at least large enough to include at least one stem 104, as shown in the close up of FIG. 3. Further, as shown in FIG. 2, multiple interstices 154 may be included in the cluster 152.

As shown in FIGS. 2 and 3, at least one stem 104 may be included within the interstice 154 of the cluster 152. As taught above, the plant end 116 thereof may converge to a given stem receptacle 128 of a given plant body 106 in the cluster 152. Furthermore, as mentioned, the stem 104 may define the vine end 118, and the vine ends 118 of a plurality of stems 104 disposed within the interstice 154 may converge to form the vine 122. Exemplary configurations are illustrated in each of FIGS. 2 and 3. These configurations provide additional unique and novel advantages over the prior art products. The inclusion of the interstices 154 and stems 104 and vines 122 disposed therewithin tends to create a more lifelike product 100. Moreover, the patterns and configurations of the interstices 154, including the relative orientation of the plant bodies 106 and stems 104, may be altered as desired in order to adapt such teaching for different types of plant bodies 106 and settings. For example, it is contemplated that objects other than stems 104 may be shown in the interstices 154. If the background for the plant bodies 106 were a lattice, the lattice may therefore show through a given interstice 154. Other modifications and improvements are contemplated and may be made with the skill in the art.

According to yet another innovative aspect of the present invention, the stem depth 120 of embodiments of the present invention is preferably increased compared to that of the prior art. Such a modification also tends to make the product more lifelike than the prior art. Indeed, the stem depth 120 provides another aspect of realism for the product. In most embodiments, the stem depth 120 is preferably at least 1/16 inch. However, the stem depth 120 may be determined in response to the general configuration and arrangement of the stems 104 and the plant bodies 106.

Exemplary Implementations of the Method of Making

As is known in the art, when using a CNC mill, the dimensions of the product 100 must be input into a program that controls the function and output of the CNC mill. As shown in FIG. 2-5, the product 100 includes a three-dimensional design and therefore includes dimensions representative of the shape and size of the product 100. Initial parameters may need to be input into the program in order to obtain the proper scaling and orientation of the three-dimensional design with respect to the blank 102. Upon entering all of the required parameters for the carving operation to take place, the process may be initiated, which will be further described below. Further, after uploading G-code to the machining center, the product 100 may be made using the methods described herein.

The method includes the steps of fastening the blank 102 to the machining center for processing. This is typically performed using proper fasteners, such as clamps. Next, the blank 102 is machined to form at least one elongate stem 104 and at least one plant body 106 into the upper portion of the blank 102. Additionally, the method also includes the step of machining the arcuate rim 148 into the stem receptacle 128. A further aspect of the present method includes the step of machining the flattened area 150 into the top surface 124 of the plant body 106 adjacent the stem receptacle 128.

According to yet another embodiment of the present method, the method may include the step of machining at least one stem 104 within the interstice 154 of the cluster 152. As taught above, the plant end 116 thereof may converge to a given stem receptacle 128 of a given plant body 106 in the cluster 152. Furthermore, the method may also include the step of machining a plurality of stems 104 within the interstice 154. Thus, as another aspect of the method, each of the plant ends 116 of the plurality of stems 104 may be machined to converge to a plurality of respective plant bodies 106 of the cluster 152. Additional aspects of the present method may also include machining the stem 104 with the stem depth 120 being at least 1/16 inch. It is noted that the above method may be variously modified to incorporate the numerous features of the product 100 described above.

Furthermore, as is known in the art, a CAD/CAM application, which includes three-dimensional CNC capability, may be utilized in all relevant steps to generate CNC command data. For example, Artcam from Delcam Interantional is an exemplary program that may be used; nevertheless, any software application having CNC capabilities may be utilized.

According to an implementation of the present method, a three dimensional model of the product 100 may be created on a computer workstation in a variety of well known methods. Where a pre-existing physical carving is available, the preferred method is scanning the carving, as opposed to the more time-consuming task of preparing a model of the carving directly on the computer through well known CAD software applications. Typically, a laser scans across the carving, and measures the flight time of the laser pulse to determine the distance from the scanner to each point on the carving the laser reflects off of. Upon scanning, a point cloud of three dimensional points that represent the carving is produced by the computer which controls the scanner. Prior to the scan, the name of the scan, the size of the carving, and the positioning of the scanner is defined and entered into the computer. Preferably, in order to obtain an improved scan, the surface of the carving may be coated with a dulling material. Thus, utilizing this technique, any variety of handmade variations may be made to the product 100 and later uploaded to the computer using the laser scan.

After obtaining the point cloud, the model represented thereby may be manipulated for improved efficiency in transforming the same into a polygonal mesh. Among the well recognized operations include smoothing the transition between data points and eliminating extraneous data points through noise reduction. Upon completing the point cloud clean-up process, the data in the point cloud may be transformed into a polygonal mesh, which is a mathematical representation of the surfaces captured in the point cloud.

The aforementioned polygonal mesh model may be edited to fill any existing holes in the same where insufficient data was collected. Additionally, boundaries may be verified and repaired for a continuous, uninterrupted surface, and the number of control points defining the polygon are increased or decreased for a smooth outline of the polygonal mesh.

From the polygonal mesh model, a Non-Uniform Rational B-Spline (NURBS) surface model may be created by a meshing/patching process. As will be understood by a person having ordinary skill in the art, NURBS can create a robust and accurate geometric description of the carving so that the definition of a contour is not lost. At the routing stage, NURBS can define points along the contour such that a CNC machine can interpolate the arcs along the path created by the points. Thus, NURBS data can be used to control the CNC machine movements via the CNC controller to perform a highly accurate and improved surface finish. First, patches are uniformly arranged in a layout to represent the shape of the carving, and a high grid-resolution structure is laid on each individual patch. Thereafter, a NURBS surface may be fit to each patch, while retaining tangent continuity across all patch boundaries. This step involves defining the various curvatures of the carving, wherein a contour line is determined by the number of curvature changes in the carving model. Using this information the model may be separated into regions of low curvature change and low curvature changes, and contour lines are defined. The NURBS surface is then divided into quadrangular patches, and each patch is connected by four polylines, or patch boundaries, which are arranged to cover the polygonal surface of the carving model.

Upon modeling the three-dimensional carving as a NURBS model, such resulting model may be scaled to the appropriate size, and measurement accuracy and quality of surface is verified. The dimensions of the blank 102, as inputted into the computer, may then be utilized to scale the model so that the final carving will be properly placed on the blank 102. Additionally, in generating the G-code, relative locations of toolpaths about the dimensions the design may be adjusted.

As will be understood by a person of ordinary skill in the art, for any given carving tasks, the CNC G-code generated may require multiple tools and multiple toolpaths. In production settings such toolpaths are typically merged for further speed and efficiency, but during prototyping it is often desirable not to merge such toolpaths. Accordingly, prior to generating the CNC G-code, an option may be selected by the operator to merge or not to merge toolpaths.

Therefore, according to yet another aspect of the present method, the method may include the step of changing tools of the machining center. In this regard, it is preferable to begin the machining of the blank 102 with roughing passes to remove as much material as possible while preserving the shape and design of the carving product 100. The method is preferably performed using five tools to carve the carving product, although the method may easily be modified to use fewer or more tools. A first tool may be used to create a rough cut into the carving product 100. For example, the first tool may be a ½ inch diameter drill bit. As the method steps are performed, and as the detail required by the tooling increases, the tools should decrease in diameter, as is known by one of skill in the art. Thus, if a fifth tool is used, the fifth tool may be used to create a finished cut into the carving product 100. For example, the fifth tool is a 1/16 inch diameter drill bit.

In another aspect of the present invention, a computer data signal is also provided that is embodied in a computer readable media for producing the lifelike carving product 100. The computer data signal comprises code configured to cause a processor to implement various embodiments, aspects, and implementations of the method disclosed herein.

Finally, in yet another aspect of the present invention, as mentioned above, it is also contemplated that the negative form of the product 100 may be created. The negative form may facilitate the fabrication of the product 100 using other fabrication methods such as molding, thermoforming, or stamping, to name a few. Thus, the product 100 may be formed as a solid whole, or as a hollow product. In such processes, the product 100 may be formed from materials such as resins, foams, liquids (metals or otherwise), sheets of metal, and other suitable materials for the respective forming operation, which may be used to create the product 100 using the negative form. Such materials may simply be poured into or formed to the negative mold in order to fabricate the product 100. For example, pressure such as by vacuum or direct force, may be applied to sheets of material in order to have the material formed precisely to an interior surface of the negative form. Additionally, resins or foams may be easily poured into the negative form and subsequently cured in order to prepare the product. Other finishing operations may also be necessary depending on the type of manufacturing process used. The creation of the negative form may be performed using principles known in the art.

The negative form should preferably provide a substantially equally-detailed and precise product as formed using the method described herein in order to ensure the lifelike nature of the product. The use of negative forms may increase the speed and facility of manufacture of the product 100, and may therefore have various advantages over methods incorporating machining and the like. Additionally, although methods of machining allow for the creation of a genuine wood product that includes the wood grain (which may be necessary to provide the proper aesthetic effect), it is also contemplated that the negative form may include small subtle ridges and/or like designs on the interior surface of the negative form in order to give the visual impression that a molded product has been cut from wood.

The above description is given by way of example, and not limitation. Given the above disclosure, one skilled in the art could devise variations that are within the scope and spirit of the invention disclosed herein, including various ways of modifying the configuration of the plant bodies 106, stems 104, interstices 154, background 108, and other features of the product 100, as well as various ways of modifying the implementations of the method. Further, the various features of the embodiments disclosed herein can be used alone, or in varying combinations with each other and are not intended to be limited to the specific combination described herein. Furthermore, the method and product taught herein may be formed using a variety of tools, machines or otherwise, and may be crafted by hand or mechanically. Thus, the scope of the claims is not to be limited by the illustrated embodiments.

The invention claimed is:

1. A method for producing a lifelike product on a multi-axis machining center, the method comprising:

fastening a blank to the machining center for processing, the blank defining an upper portion;

machining at least one elongate stem and at least one plant body into the upper portion of the blank, the at least one stem defining a respective plant end, the at least one plant body defining a top surface, the at least one plant body including a respective stem receptacle whereto respective the plant end of the at least one stem converges, the respective stem receptacle at least partially disposed on the top surface of the at least one plant body;

machining an arcuate rim into the respective stem receptacle, the arcuate rim substantially encircling at least a portion of the respective plant end of the at least one stem disposed within the respective stem receptacle; and machining a flattened area into the top surface of the at least one plant body adjacent the respective stem receptacle.

2. The method of claim 1 wherein the flattened area extends over approximately one-fourth of the top surface of the at least one plant body.

* * * * *